Patented Dec. 28, 1937

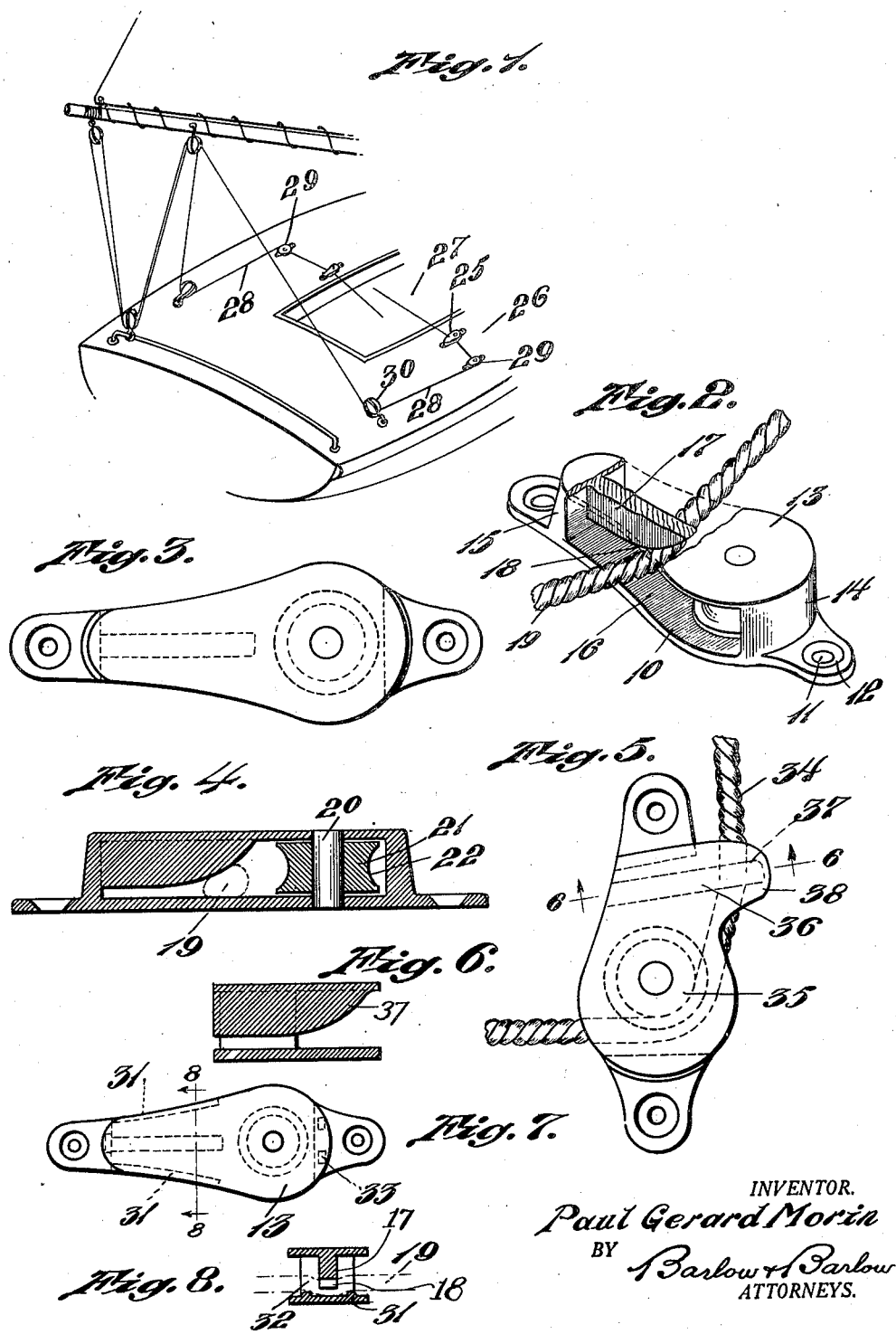

2,103,630

UNITED STATES PATENT OFFICE 2,103,630

CLEAT

Paul Gerard Morin, Apponaug, R. I.

Application August 1, 1934, Serial No. 737,922

5 Claims. (Cl. 114—101)

This invention relates to a cleat, more particularly for use on small sailing craft, altho it has many other uses as will readily occur to one familiar with the art; and has for one of the objects of this invention to provide a cleat to which a rope may be quickly secured and released.

Another object of the invention is to provide a cleat of such a construction that a rope may be secured thereto by moving it in a single direction and released therefrom by moving it in an opposite direction, which directions will be at generally right angles to the extent of the rope.

Another object of the invention is to provide a securing means comprising a cleat to which a rope may be secured by moving it in a single direction at right angles to its general extent and then directing the extent of the rope so that it will be in a position from which operation of the cleat is to be most conveniently had.

Another object of the invention is the provision of anti-friction means against which the rope will engage when removed from its securing position and thus a guide over which the rope will be pulled when disengaged from the cleat.

A still further object of the invention is the provision of a definite guide for the rope confining it in adjacency to the cleat so that simple and quick operation to secure the rope beneath the cleat may be had.

With these and other objects in view, the invention consists of certain novel features of construction, as will be more fully described, and particularly pointed out in the appended claims.

In the accompanying drawing:

Fig. 1 is a perspective view of a fragmental portion of a sailing craft, illustrating two cleats positioned for securing the opposite ends of the main sheet.

Fig. 2 is a fragmental perspective view of my cleat with its fragmental portion of rope extending therethrough.

Fig. 3 is a top plan view.

Fig. 4 is a central sectional view.

Fig. 5 is a top plan view of a different modified form of cleat.

Fig. 6 is a sectional view on line 6—6 of Fig. 5.

Fig. 7 is a top plan view of a second modified form of cleat.

Fig. 8 is a sectional view on line 8—8 thereof.

In many instances it is desirable to quickly secure or release a rope without tying the same and for such frequent connections and disconnections it is usual to use some sort of a cleat. This is particularly true for small sailing craft, particularly racing craft, where it is desired to detach a rope or make it fast upon coming about or changing the course of the craft; and in order to accomplish this result different sorts of cleats, such as a teeter cleat or a "bulldog" cleat is used for such results. These cleats, however, require moving parts and are accordingly expensive to manufacture. The cleat which I have provided has no moving parts but is of a rigid construction which may be cast making the construction simple, inexpensive and yet effective in its operation; and the following is a more detailed description of the present embodiment of this invention illustrating the preferred means by which these advantageous results may be accomplished.

With reference to the drawing, my cleat consists of a base member or plate 10, the ends of which are provided with holes 11 chamfered as at 12, to receive screws or bolts for fastening the base in position. A plate member 13 is spaced from the base 10 by integral, rigid supports 14 and 15, at either end thereof leaving an elongated space 16 between the plates 10 and 13.

I form integral with this plate member 13 a projection 17 which has an inclined or cam surface 18 so as to confine a rope which is slid thereunder between this cam surface 18 and the top surface of the base member 10, and by forcing the rope 19 along this cam surface, it will be compressed and jammed and held securely in the position into which it is moved.

As appears clearly in Figure 4, the plate 10 is flat in the plane of rib 17, so that, although the rope is held firmly between the rib and plate when desired, there is no danger of jamming the rope to the extent of delaying its release at times when it is needed to release it quickly.

All of the parts so far described may be cast in one integral piece. However, it may be desirable, and I have here illustrated at the other end of the device between the plates, an antifriction means which the rope may engage when slid from beneath the jamming portion 17 just described. This antifriction means consists of a pin 20 riveted in position between the plates 10 and 13 and on this pin I mount a sheave 21 having a groove 22, this sheave being freely rotatable about the pin 20. Thus when the rope is pulled from beneath the jamming or cam surface by a movement at right angles to the general extent of the rope, it engages the grooved surface of the sheave 21 and upon movement lengthwise in either direction is antifrictionally supported and guided so as to cause a more easy movement of the rope lengthwise thereof through the plates. The sheave may or may not be mounted in a cleat of this character but in case of its absence some suitable guiding surface would be provided for the rope in its movement between the plates.

In the use of a cleat of this character, I have illustrated one typical example in Fig. 1, where the cleat designated generally 25 is screwed upon the deck 26 of a small sailing craft, there being one located on the deck on either side of the cockpit 27 so that both ends of the main sheet 28 are secured and may be adjusted. The main sheet on a sailing craft leads at various angles depending upon the position of the sail with reference to the boat and in order that this sheet may always be in the same direction with reference to my cleat, I have provided pulleys 29 located just outwardly of the cleat 25 so that the main sheet in this case on either side of the cockpit will be led through the guide 30 and guide 29 and then through the cleat 25 so that the skipper handling the tiller and sitting on either side of the boat along the deck 26 is in an advantageous position to operate the main sheet by moving it laterally of the craft, that is, if he desires to slack off on the main sheet 28, it is merely necessary to take hold of the sheet inwardly of the cleat 25 and move it forwardly of the boat against the sheave 21, which will permit it to run off freely until the desired amount is let off, he will then throw the rope laterally towards the stern beneath the cam surface 18 where it will jam, or the reverse may take place if it is desired to trim in the sheet, the skipper being able to brace his feet and pull inwardly from an advantageous position.

In the modifications illustrated in Figures 7 and 8, I have shown ribs 31 formed on the base plate 10 which project upwardly on either side of the projection 17 so that the rope 19 will be disposed in a sinuous path, indicated at 32 in Fig. 8, when placed beneath the projection 17. In this instance the top plate member 13 will be formed separately from the base member 10 and prongs or projections 33 will be provided and extend through corresponding openings in the base 10 and then riveted over, it being assembled in two parts. This modification may be made in this way so that the surfaces along which the rope may travel may be finished which could not be done with the projections 31 cast thereon, if the device were made all in one piece.

In the modification illustrated in Figures 5 and 6 the device is more adapted for use on a tent stake. Here the rope 34 will be in engagement with the sheave 35 when the rope is clamped between the bottom plate and the projection 37 which is formed on the top plate 36 and extends to provide an open mouth along at the protruding portion 38 of the top plate 37. In this manner the rope may be drawn from the tent and over the pulley and then permanently mounted upon the stake and quickly secured between the cam surfaces by a lateral movement.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. Cord securing means comprising a base, a plate, means for spacing said plate from said base, an inclined projection on the under side of said plate affording varying distances between it and said base for clamping a rope by lateral movement thereunder, and ribs on said base at either side of said projection for causing a rope placed under said projection to be disposed in a sinuous path.

2. Cord securing means comprising a base, an inclined projection connected to said base and affording varying distances between it and said base for clamping a rope by lateral movement therebetween, and ribs on said base at either side of said projection for causing a rope placed under said projection to be disposed in a sinuous path.

3. Cord securing means comprising a base, an inclined projection connected to said base and affording varying distances between it and said base for clamping a rope by lateral movement therebetween, said base having a flat portion in the plane of said projection to avoid excessive jamming of the rope, and ribs on said base at either side of said projection for causing a rope placed under said projection to be disposed in a sinuous path.

4. A cleat comprising elongated spaced plate members, one of said plate members having extensions thereon for securing it to a flat surface or the like, connecting portions at the ends of said plate members and at substantially right angles thereto for securing said plate members together, a pulley rotatably secured between said plates and positioned adjacent to one of said connecting portions, a relatively narrow elongated projection centrally positioned and secured to one of said members and spaced from the other member, said projection having a cam surface thereon for compressing and holding a rope forced between it and the opposite plate member and spaced from said pulley a distance affording a free path of travel of a rope therebetween.

5. A cleat comprising elongated spaced plate members, one of said plate members having extensions thereon for securing it to a flat surface or the like, connecting portions at the ends of said plate members and at substantially right angles thereto for securing said plate members together, a pulley rotatably secured between said plates and positioned adjacent to one of said connecting portions, a projection secured to one of said members and spaced from the other member, said projection having a cam surface facing said pulley for compressing and holding a rope forced away from the pulley and between it and the opposite plate member and spaced from said pulley a distance affording a free path of travel of a rope therebetween.

PAUL GERARD MORIN.